(12) United States Patent
Konowitz et al.

(10) Patent No.: US 12,481,499 B1
(45) Date of Patent: Nov. 25, 2025

(54) UPDATING SUPPORT DOCUMENTATION FOR DEVELOPER PLATFORMS WITH TOPIC CLUSTERING OF FEEDBACK

(71) Applicant: Intuit Inc., Mountain View, CA (US)

(72) Inventors: Bryan Konowitz, Mountain View, CA (US); Ameen Hossam Radwan, Boston, MA (US); Kevin Scott Luster, San Diego, CA (US); Gennadiy Ziskind, Mountain View, CA (US); Carlos Mariscal, Mountain View, CA (US); Gurveer Khakh Khaira, Danville, CA (US); Minjung Shin, Mountain View, CA (US); Shruthi Raju, Mountain View, CA (US); Pavan Koundinya Kaipa, Menlo Park, CA (US); Zhigang Lin, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/193,912

(22) Filed: Apr. 29, 2025

(51) Int. Cl.
 *G06F 8/73* (2018.01)
(52) U.S. Cl.
 CPC ..................... *G06F 8/73* (2013.01)
(58) Field of Classification Search
 CPC .......................................................... G06F 8/73
 USPC ....................................................... 717/123
 See application file for complete search history.

(56) References Cited

U.S. PATENT DOCUMENTS

| | | | |
|---|---|---|---|
| 7,562,297 B2 * | 7/2009 | Carroll | G06F 9/451 715/764 |
| 10,558,657 B1 * | 2/2020 | Cheng | G06F 16/93 |
| 11,633,405 B2 * | 4/2023 | Kadajji | A61K 31/565 424/430 |
| 12,321,269 B2 * | 6/2025 | Abdoulaye | G06F 12/0802 |
| 2012/0102121 A1 * | 4/2012 | Wu | G06Q 30/0282 709/206 |
| 2014/0229237 A1 * | 8/2014 | Tryfon | G06Q 30/0203 705/7.32 |
| 2015/0178304 A1 * | 6/2015 | Gross | G06F 16/24578 707/732 |
| 2019/0205124 A1 * | 7/2019 | Fan | G06F 8/73 |
| 2021/0304142 A1 * | 9/2021 | Bar-on | G06F 8/73 |

* cited by examiner

*Primary Examiner* — Wei Y Mui
*Assistant Examiner* — Amir Soltanzadeh
(74) *Attorney, Agent, or Firm* — Lathrop GPM LLP

(57) ABSTRACT

A method includes obtaining at least one feedback response from a developer regarding an answer and corresponding source documents of the answer in a discussion thread initiated by the developer. The method further includes converting the discussion thread into a topic model clustering input, responsive to the feedback response specifying an unsatisfactory category of feedback responses, to obtain a multitude of topic clustering model inputs. The method further includes periodically processing the multitude of topic clustering model inputs by a thread-topic clustering model to obtain a multitude of candidate topics. The method further includes processing, by an answer generation model, a first candidate topic of the multitude of candidate topics to obtain a multitude of corresponding documentation recommendations for the candidate topic. The method further includes presenting the first candidate topic and the multitude of corresponding documentation recommendations.

15 Claims, 5 Drawing Sheets

Response generated by ANSWER GENERATION MODEL:

Area of focus: Intelligent Assist Auto-Response Management
Existing documentation section: There is no section dedicated to managing Intelligent Assist auto-responses
Recommendation Evaluation: New section needed.
A new section should be created, titled "Managing Intelligent Assist Auto-Responses". The section should cover:
- Instructions for fine-tuning Intelligent Assist's auto-response behavior
- How to disable or adjust unnecessary auto-responses based on Slack activity
- Examples of how to manage response timings and escalation procedures.

Action: Add a new section titled "Managing Intelligent Assist Auto-Responses" to the documentation with the detailed instructions mentioned above.

412 →

Topic clusters:
MANAGE-INTELLIGENT_ASSIST AUTO-RESPONSE
  Thread 1: How to I disable Intelligent Assist auto response for a particular page?
    Feedback response:Document does not contain function call
    Source document: :http://Iassist_capability/overview.html
    Support (SME) recommendation – Generate new document
  Thread 2: How do I turn off IA?
    Feedback response: Wrong document
    Source document: :http://Iassist_capability/overview.html
    Support (SME) recommendation –This document does not have the API mentioned in the answer. Generate documentation for the API
  Thread 3:  IA API to enable/disable for a page,
    Feedback response- Cannot find in provided document
    Source document - :http://Iassist_capability/overview.html
    Support (SME) recommendation –Looks like the wrong document was returned. Change the documentation or generate new documentation.

402

Question:  How do I disable Intelligent Assist Auto-response for a particular page?
Answer:  Implement the Auto-response feature by calling the ASSIST_API startAutoResponse( param1, flag 1=true/false)...
Source:http://Iassist_capability/overview.html

404

Example of user feedback
Q&A Application: Was this answer helpful: a) Yes b)Insufficient information c)Document lacks information d) Irrelevant
Feedback response: c).
(Feedback response category: Unsatisfactory)
Q&A Application: Opening support ticket 0110765...
Support ticket tracking application: Enter your recommendation here for support ticket 0110765...
SME recommendation: Source link does not have the API call shown in answer. New documentation recommended for API call.
Recommended topic – Manage Intelligent Assist Auto-response

406

Example of topic clustering model output
INTELLIGENT ASSIST CAPABILITY-
CANDIDATE TOPIC - MANAGE-INTELLIGENT_ASSIST AUTO-RESPONSE
Example of Document directory entries:
INTELLIGENT ASSIST CAPABILITY
Http://Iassist_capability/overview.html
Topic: ADDING PAGE CONTEXT
  http://Iassist_capability/add_page_context.html
Topic: Add User Context:
  http://Iassist_capability/add_user_context.html

408

Example of answer generation output after document mapping:
No document found for Topic "Intelligent Assist Auto-Response Management
SME recommendation – generate new documentation for new topic.
Example of LLM prompt:
Input (contents of Block 404), (Document mapping output)
Instruction: Based on the inputs generate a response that specifies documentation enhancement or new documentation requirement, and generate recommendations for content of the enhancement or requirement

UPDATING SUPPORT DOCUMENTATION FOR DEVELOPER PLATFORMS WITH TOPIC CLUSTERING OF FEEDBACK

BACKGROUND

Codebase management refers to organizing, maintaining, and controlling the source code of a software product. Enterprises selling computer software products and services may have vast codebases, spanning across diverse services and capabilities. Capabilities refer to specific functions or feature implementations in the codebase that implement the business objectives of enterprise software products. Codebase management may entail practices of version control, branching strategies, etc. Many capabilities of the codebase may be used across diverse software products. Developers use existing capabilities to enhance or implement new features and functions for enterprise software products. In developing software code for a project, effective leverage of the capabilities of an enterprise codebase may be dependent on current, accurate, and detailed support documentation. Support documentation of a codebase may include diverse written materials that help developers understand, use, and maintain the codebase. Support documentation may include code comments, README files, Application Programming Interface (API) documentation, change logs, design documents, etc.

Manual updates and maintenance of support documentation across the capabilities of an enterprise codebase may be labor-intensive and resource-expensive. Tracking of support documentation requests across support tickets and resolution may result in overlooking some requests and incorrect resolution of duplicate support documentation requests. A technical challenge arises in automating the resolution of support documentation requests by determining the content changes and additions and further, updating support documentation. More particularly, a technical challenge arises in discovering and resolving gaps in support documentation, requiring ab initio support documentation, and insufficiencies in support documentation, requiring enhancement, or updates, of existing support documentation.

SUMMARY

In general, in one aspect, one or more embodiments relate to a method. The method includes obtaining at least one feedback response from a developer regarding an answer and corresponding source documents of the answer in a discussion thread initiated by the developer. The method further includes converting the discussion thread into a topic model clustering input, responsive to the feedback response specifying an unsatisfactory category of feedback responses, to obtain a multitude of topic clustering model inputs. The method further includes periodically processing the multitude of topic clustering model inputs by a thread-topic clustering model to obtain a multitude of candidate topics. The method further includes processing, by an answer generation model, a first candidate topic of the multitude of candidate topics to obtain a multitude of corresponding documentation recommendations for the candidate topic. The method further includes presenting the first candidate topic and the multitude of corresponding documentation recommendations.

In general, in one aspect, one or more embodiments relate to a system. The system includes at least one computer processor, and an answer generation model, executing on the at least one computer processor. The system further includes a thread-topic clustering model, executing on the at least one computer processor. The system is configured to obtain at least one feedback response from a developer regarding an answer and corresponding source documents of the answer in a discussion thread initiated by the developer. The system is further configured to convert the discussion thread into a topic model clustering input, responsive to the feedback response specifying an unsatisfactory category of feedback responses, to obtain a multitude of topic clustering model inputs. The system is further configured to periodically process the multitude of topic clustering model inputs by the thread-topic clustering model to obtain a multitude of candidate topics. The system is further configured to process, by the answer generation model, a first candidate topic of the multitude of candidate topics to obtain a multitude of corresponding documentation recommendations for the first candidate topic. The system is further configured to present the first candidate topic and the plurality of corresponding documentation recommendations.

In general, in one aspect, one or more embodiments relate to a method. The method includes obtaining a first candidate topic of a multitude of candidate topics from a thread-topic clustering model. The first candidate topic includes a multitude of corresponding topic discussion threads, a multitude of corresponding topic source documents, and a multitude of corresponding topic model recommendations. The method further includes obtaining a multitude of support discussion threads corresponding to a multitude of support tickets. The method further includes identifying a set of support discussion threads from the multitude of support discussion threads that match a corresponding set of topic discussion threads of the multitude of corresponding topic discussion threads of the first candidate topic as a set of high-value threads. The method further includes obtaining a multitude of document directory entries corresponding to a capability of the first candidate topic. The method further includes generating a first prompt to an answer generation model including, as a first input, the multitude of document directory entries, and a first instruction to identify relevant document directory entries corresponding to the first candidate topic from the multitude of document directory entries. The method further includes processing the first prompt by the answer generation model to obtain the relevant document directory entries. The method further includes obtaining a relevant document set identified by the relevant document directory entries from a document store. The method further includes matching the relevant document set with the multitude of corresponding topic source documents of the first candidate topic to obtain a candidate document set. The method further includes generating a second prompt to the answer generation model including, as a second input, the candidate document set, the set of high-value threads, and the multitude of corresponding topic model recommendations of the first candidate topic, and a second instruction to generate a document enhancement recommendation for the candidate document set, with content suggestions for the document enhancement recommendation based on the second input of the second prompt.

Other aspects of one or more embodiments will be apparent from the following description and the appended claims.

BRIEF DESCRIPTION OF DRAWINGS

FIG. 4 shows an example of a new documentation recommendation, in accordance with one or more embodiments.

DETAILED DESCRIPTION

One or more embodiments are directed to automatic improvement of support documentation of an enterprise codebase. The automatic improvement of the support documentation is realized by feedback collection and analysis of discussion threads. The discussion threads are records of natural language conversations. Discussion threads may be initiated by developers in a question-and-answer (Q&A) support application, such as an intelligent assistant. The conversations may include multiple questions, corresponding answers, and support documentation sources used to generate the answers. The discussion threads may further include feedback responses from developers regarding answers and corresponding support documentation. The feedback responses may belong to either a "satisfactory" category, or an "unsatisfactory" category. The categories indicate the developers qualitative rating of the answer and support documentation. The feedback responses that fall under an "unsatisfactory" category are analyzed.

Analysis may be performed as follows. The discussion threads having unsatisfactory category feedback responses are clustered by a topic clustering model. The topic clustering model is trained to cluster discussion threads by a main topic of the discussion threads. The main topic refers to a specific topic of a capability of the enterprise codebase. The discussion threads corresponding to a topic are analyzed by obtaining the corpus of support documentation, including a multitude of source documents, corresponding to the capability that encompasses the topic. The support documentation is cross-referenced, or mapped, to source documents presented in the discussion threads. An answer generation model, which is a large language model, is prompted to determine if the cross-referenced support documentation is relevant to the main topic. If relevant support documentation is not found by the answer generation model, a gap in support documentation is identified. If relevant support documentation is found by the answer generation model, and if the feedback responses from the discussion thread indicate that the answer and/or source documents are unsatisfactory, an enhancement requirement for existing support documentation is identified. The answer generation model is further prompted to generate respective recommendations and suggested content for new support documentation or an update to existing support documentation.

Figure 1:
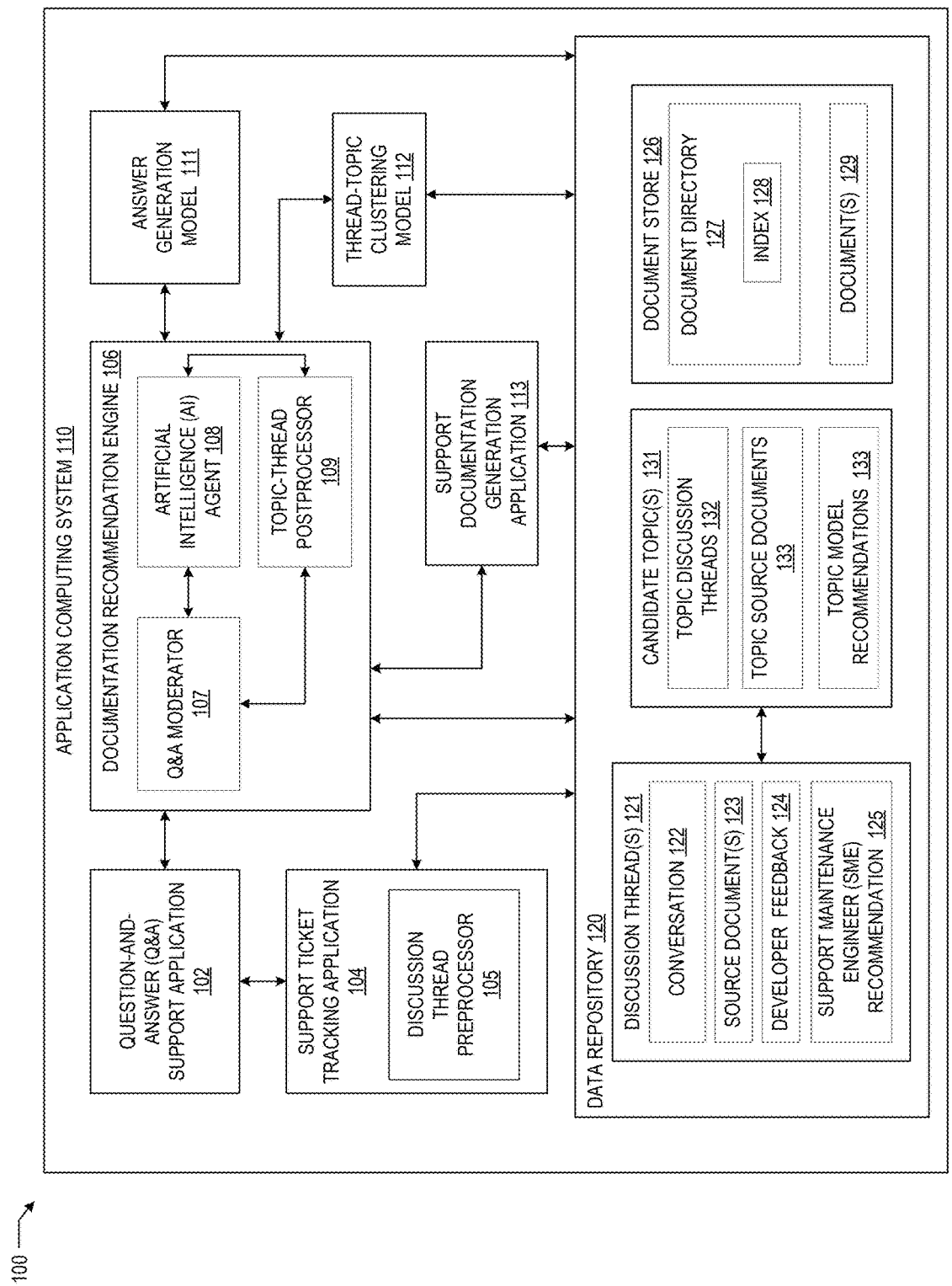
FIG. 1 shows a computing system, in accordance with one or more embodiments.

Attention is now turned to the figures. FIG. 1 shows a computing system, in accordance with one or more embodiments. The system shown in FIG. 1 may include a server computing system (110). The server computing system (110) is one or more computer processors, data repositories, communication devices, and supporting hardware and software. The server computing system (110) may be in a distributed computing environment. The server computing system (110) includes a computer processor. The computer processor is one or more hardware or virtual processors which may execute computer readable program code that defines one or more applications. The one or more applications may include the Q&A support application (102), the support ticket tracking application (104), the documentation recommendation engine (106), the answer generation model (111), the thread-topic clustering model (112), and the support documentation generation application (113). An example of the computer processor is described with respect to the computer processor(s) (502) of FIG. 5A. Thus, the server computing system (110) is configured to execute one or more applications, such as the Q&A support application (102), the support ticket tracking application (104), the documentation recommendation engine (106), the answer generation model (111), the thread-topic clustering model (112), and the support documentation generation application (113). An example of a computer system and network that may form the server computing system (110) is described with respect to FIG. 5A and FIG. 5B.

The system (100) shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or devices.

The data repository (120) includes a document store (126). The document store (126) includes multiple documents (129). The document(s) (129) constitute diverse corpora of support documentation for various capabilities of an enterprise codebase.

In the context of a large enterprise codebase, a capability refers to a specific functionality or feature of a software system. Capabilities may be defined in terms of functionalities needed to meet business requirements and user needs. Topics and sub-topics refer to specific functional aspects of a capability. In the context of support documentation for capabilities, an ontology refers to a structured framework that logically organizes the capabilities, and topics and sub-topics of the capabilities. For example, if a capability is "user authentication management," some topics may be "user identity verification," and "manage access control." The organization is informed by the various functionalities of the capabilities, and their interconnections.

Capabilities may encompass multiple components or services within the codebase. Support documentation for a particular capability may be generated by a capability owner, and may encompass multiple document(s) (129). Capability owners may be individuals or teams responsible for the development and maintenance of specific codebase capabilities within the enterprise. Thus, the document(s) (129) may be used by the answer generation model (111) to generate answers to questions posed by developers in the Q&A support application (102). Further, the answer generation model (111) may use the document directory (127) of the document store (126) to retrieve the document(s) (129) from which to generate an answer to a particular question.

The document directory (127) may be a classification system for the document(s) (129) in the document store (126). The document directory (127) may be a hierarchical directory structure. The hierarchical directory structure may be based on the ontology of support documentation. The ontology of the support documentation may be machine-interpretable. That is, the ontology may be generated using standardized languages and frameworks that allow machines to read, interpret, and manipulate the data without human intervention. The document directory (127) hierarchical structure may correspond to the logical ontology of the support documentation. For example, the support documentation ontology may include ten capabilities. A first capability may have fifty topics. The tenth of those topics may have seven sub-topics, and so on. The document directory (127) hierarchical structure may mirror this ontology, by having ten folders at a first level of the hierarchical structure, corresponding to the ten capabilities. The first folder corresponding to the first capability may have fifty subfolders at the second level of the hierarchical structure, corresponding to the fifty topics. A tenth subfolder of the fifty subfolders may further have seven subfolders at the third level of the hierarchical structure, corresponding to the seven sub-topics.

In one or more embodiments, the document directory (127) may include document directory entries. A document directory entry may include a logical link to a document (129) of the document store. The document directory entry may further include a descriptor of the corresponding document. The document directory (127) may include an index (128) at the root level of the document directory (127). In an example implementation, the index (128) may be a README file that links to all the main capabilities, and topics. The document directory (127) may further include a search functionality.

The data repository (120) includes one or more discussion thread(s) (121). The discussion thread(s) (121) are records of interactive sessions between a developer and the Q&A support application (102). A discussion thread (121) includes a conversation (122). The conversation (122) includes questions asked by developers and corresponding answers to the questions, in other words, a "conversation". There may be multiple questions and answers in a conversation (122). The discussion thread (121) may further include one or more source document(s) (123). A source document is a document that is used by the answer generation model (111) to generate an answer to a question of the conversation (122). Multiple source document(s) (123) may be used to generate a particular answer, therefore multiple source document(s) may correspond to a particular answer.

The discussion thread (121) may further include developer feedback (124). The developer feedback (124) may be a pre-defined category of a feedback response, and/or free text that a developer may provide during the conversation of a discussion thread. The feedback response pertains to a qualitative rating of the answers and source documents provided in the conversation. The developer feedback (124) may include predefined feedback responses that rate the answers, e.g., "of help", "not relevant", "misunderstood my question", "off-topic", etc. Further, these predefined feedback responses may be categorized by broad categories of "satisfactory" and "unsatisfactory." A "satisfactory" category of feedback responses refers to specific predefined feedback responses that indicate that the developer is satisfied by the answers provided by the system, e.g., "relevant answer," "of help," "understood my question," etc. An "unsatisfactory" category of feedback responses refers to specific predefined feedback responses that indicate that the developer is not satisfied by the answers provided by the system, e.g., "misunderstood my question," "off-topic" "answer incomplete," "irrelevant," "not pertinent to the intent of the question," etc. Thus, the developer feedback (124) may include the specific predefined feedback response and the category of the feedback response.

Additionally, the developer feedback (124) may include free text. The free text may be one or more natural language utterances, such as sentences or paragraphs, provided by the developer, in addition to the predefined feedback responses and corresponding categories.

The discussion thread (121) may further include a support maintenance engineer (SME) recommendation (125). The SME recommendation (125) may refer to predefined recommendations and/or free text provided by an SME. The SME may provide the recommendation during servicing of a support ticket corresponding to the discussion thread (121). The SME recommendation (125) may use a set of predefined recommendations. Further, the SME recommendation (125) free text may include recommendations by the SME based on the interpretation and analysis by the SME of the discussion thread. One example of a recommendation may be to add more information related to a specific question raised by the developer in a particular source document, which has related information to the specific question. Another example of a recommendation may be to generate ab initio documentation that answers particular questions by the developer.

The data repository further includes one or more candidate topic(s) (131). A candidate topic (131) is the output of the thread-topic clustering model (112). A candidate topic refers to a topic of discussion corresponding to a cluster of discussion threads. For example, there may be five discussion threads in a cluster that is output by the thread-topic clustering model (112). Each of the five discussion threads may include conversations related to "managing Intelligent Assist Auto-Response." Thus, the candidate topic (131) of the cluster of the five discussion threads is "managing Intelligent Assist Auto-Response". The thread-topic clustering model (112) may be executed periodically, to process the discussion thread(s) (121) accumulated over a period of time, for example, over a calendar month. Thus, there may be multiple sets of candidate topic(s) (131). Each set may be generated by the thread-topic clustering model (112) from discussion thread(s) (121) for a particular calendar month.

The candidate topic (131) includes multiple topic discussion threads (132). In one or more embodiments, a topic discussion thread (132) is a version of a corresponding discussion thread (121), with additional labels, and metadata fields. The candidate topic (131) includes multiple topic discussion thread(s) (132), clustered under a particular candidate topic identifier, or label, by the thread-topic clustering model (112). Further, the candidate topic (131) may include multiple topic source documents (133). The topic source documents (133) are an aggregated set of source documents that were used by the answer generation model to generate answers to questions of the topic discussion threads (132). An example of a candidate topic (131) structure is shown in FIG. 4. The candidate topic (131) may further include multiple topic model recommendations (133). The multiple topic model recommendations (133) for a candidate topic (131) be generated by the thread-topic clustering model (112) in conjunction with the answer generation model (111). The topic model recommendations (133) may be generated from an aggregated set of SME recommendations obtained from the topic discussion threads. Additional information of a candidate topic may include the capability within which the candidate topic is included.

Continuing with FIG. 1, the application computing system (110) includes a Q&A support application (102). The Q&A support application (102) is software or application-specific hardware, including functionality and features for knowledge sharing, collaboration, solutions for coding problems for software developers. In one or more embodiments, the Q&A support application (102) may be a question-and-answer platform. Developers may ask a question and receive answers from capability owners or other developers. Developers may comment on questions and answers, the comments facilitating refinement of the question and answer towards guidance to a solution. One example of a Q&A support platform is Stack Overflow.

In other embodiments, the Q&A support application (102) may be an intelligent assistant, also known as AI-powered coding assistants or intelligent documentation assistants. Developers may post questions regarding coding problems or concepts. The intelligent assistant may invoke a large language model (LLM). The LLM may use retrieval augmented generation (RAG) to retrieve relevant information from the document store (126) and generate accurate and context-aware answers. The answers and corresponding source documents used by the answer generation model to generate the answers are presented to the developer. Examples of intelligent assistants include Codium AI, DeepSeek, GitHub Copilot, etc.

The Q&A support application (102) may include functionality for questions and answer sessions to take place within diverse channels. A channel refers to a virtual space for teams to collaborate and share knowledge securely. Channels may be searchable. Different channels of the Q&A support application (102) may correspond to different capabilities of the enterprise codebase. For example, one channel in the Q&A support application (102) may be an "AWS Gateway" channel. Another channel may be an "LLM API" channel. Thus, the Q&A support application (102) may host multiple discussion threads on multiple capability channels.

Within a particular channel, conversations (i.e., question and answer sequences) may be organized, for example, by using tags and structured naming conventions, into topics and sub-topics. Further, conversations in a channel centered on a specific main topic may constitute a discussion thread. When a conversation ends, a discussion thread may be considered closed, or complete, and may be used for further processing. In a different session, another, or the same, developer may start a conversation related to the same main topic. However, the conversation may be part of a different discussion thread. Thus, there may be more than one discussion thread related to a main topic of a capability. Within a discussion thread, the conversation may include several questions and answers related to sub-topics of the main topic.

A discussion thread from the Q&A support application (102) may be stored in the data repository as a discussion thread (121). The Q&A support application (102) may further include functionality to obtain developer feedback (124) from a developer regarding the quality of answers generated by the system.

The application computing system (110) further includes a support ticket tracking application (104). The support ticket tracking application (104) is software or application specific hardware including functionality to create, track and manage support issues and tasks. The support ticket tracking application (104) works in conjunction with the Q&A support application (102) to generate, track and manage support requests raised by developers in discussion threads where the developer did not find the supporting documentation answer satisfactory. In one or more embodiments, a developer feedback response of the unsatisfactory category may trigger a support request generation workflow in the support tracking application (104). The support request is identified and tracked by a "support ticket." Thus, a support request may also be known as a support ticket. The support ticket corresponds to the discussion thread. An example of a support ticket tracking application (104) is JIRA from Atlassian®.

The support tracking application (104) may further include a discussion thread preprocessor (105). As shown in FIG. 1, the discussion thread preprocessor (105) is a component of the support ticket tracking application (104). However, other architectural arrangements may be possible. The discussion thread preprocessor (105) is software or application-specific hardware that is configured to convert content and metadata of a discussion thread of the Q&A application (102) to a machine-interpretable format. The machine-interpretable format of the discussion thread of the Q&A application (102) may be stored as the discussion thread (121) of the data repository (120). For example, the discussion thread may be converted to a Javascript Object Notation (JSON) document, including fields for questions, answers, source documents, developer feedback responses, and SME recommendations. By rendering the discussion thread from the Q&A support application (102) to the machine-interpretable format, the discussion thread preprocessor (105) may convert the discussion thread to a thread-topic clustering model (112) input.

In one or more embodiments, the discussion thread preprocessor (105) may be a serverless computing function. Serverless computing functions refer to specific task functions that may be executed within a cloud computing model. The cloud provider may handle server management, scaling, and provenance of compute resources. Serverless computing functions may be triggered by an event. In one or more embodiments, the discussion thread preprocessor (105) may be triggered by a support request of the support ticket tracking application (104). The support request may correspond to a discussion thread from the Q&A support application (102) that resulted in an "unsatisfactory" feedback from the developer. One example of a serverless computing service is AWS Lambda®. Other types of functions from diverse computing paradigms are possible.

The application computing system (110) further includes a documentation recommendation service (106). The documentation recommendation engine (106) is software or application specific hardware which, when executed by the one or more computer processors, controls and coordinates operation of the software or application specific hardware described herein. Thus, the documentation recommendation engine (106) may control and coordinate the operation of the Q&A support application (102), the support ticket tracking application (104), the answer generation model (111), the thread-topic clustering model (112), and the documentation generation application (113).

The document recommendation engine (106) includes a Q&A moderator (107). The Q&A moderator (107) controls and coordinates the Q&A support application (102) in the answer generation workflow. In one or more embodiments, the Q&A moderator (107) may be configured to obtain a question from the Q&A support application (102). The Q&A moderator (107) may further be configured to determine the intent of the question based on the context of the question and the content of the question. The context of the question may include information about the channel of the Q&A support application (102) from which the question was obtained. Additionally, the context of the question may include information may include user context data of the particular developer posing the question, etc. Intent refers to the underlying purpose or goal of the originator of the question, in this case, the developer.

Based on the determined intent, the Q&A moderator (107) may perform an initial retrieval of documents from the document store (126) and invoke the artificial intelligence (AI) agent (108). The AI agent (108) of the document recommendation engine (106) serves to programmatically invoke the answer generation model (111) with a provided prompt. A prompt to the answer generation model (111) is a natural language utterance that is understood by the answer generation model (111). A prompt may be considered to include one or more inputs, one or more instructions on how to operate on/use the inputs, and one or more examples, showing how a sample input may be operated on/used by the instruction, and corresponding output. The Q&A moderator (107) may be further configured to obtain a generated answer from the answer generation model (111) via the AI agent (108) and transmit the generated answer to the Q&A application (102). Similar to the discussion thread preprocessor (105), the Q&A moderator (107) may be a serverless computing function in one or more embodiments.

The AI agent (108) of the documentation recommendation engine (106) is software or application-specific hardware configured to leverage an LLM such as the answer generation model (111) to perform complex tasks. The AI agent (108) may dynamically direct its own processes and tool usage. In other words, the AI agent (108) may adapt and respond to new information or changes in the assigned tasks in real-time. Further the AI agent (108) may autonomously determine that a complex question is to be broken down into smaller parts. Furthermore, the AI agent (108) may use search engines, databases, or APIs to gather information or perform specific actions.

The documentation recommendation engine (106) may further include a topic-thread postprocessor (109). The topic-thread postprocessor (109) is software or application-specific hardware, which when executed by the one or more computer processors, essentially performs the method of FIG. 3. Similar to the discussion thread preprocessor (105) and the Q&A moderator (107), the topic-thread postprocessor (109) may be a serverless computing function in one or more embodiments. A detailed description of the working of the topic-thread postprocessor (109) is provided in reference to FIG. 3.

The application computing system (110) further includes an answer generation model (111). The answer generation model (111) is a large language model (LLM) which uses retrieval augmented generation (RAG) to generate answers and summarizations based on support documentation of the enterprise codebase. RAG-based LLMs are large language models that combine the capabilities of an LLM with external information retrieval mechanisms. Large language models are advanced machine learning models trained on vast datasets, and include billions of training parameters, to possess advanced natural language processing capabilities. Examples of large language models include ChatGPT®, Llama®, Perplexity®, Gemini®, etc. When a prompt is presented to the answer generation model (111), the answer generation model (111) may be configured to retrieve relevant information from external knowledge sources with respect to the answer generation model (111), namely, the document store (126). The retrieved information may then be used by the answer generation model (111)'s for generating a response. The answer generation model (111) may generate a response that incorporates both the internalized, or learned, knowledge of the answer generation model, and the retrieved information. Examples of RAG-based LLM answer generation may include virtual assistants and chatbots using RAG to access current information on events, weather, news, etc.

The application computing system (110) further includes a thread-topic clustering model (112). The thread-topic clustering model (112) includes a machine learning model that is trained on training data including preprocessed and labeled discussion threads. In one or more embodiments, the thread-topic model may be an unsupervised machine learning model. The architecture of the thread-topic clustering model (112) may be diverse types of neural networks, or autoencoders, or a transformer architecture. In one or more embodiments, the thread-topic clustering model (112) may further be trained to cluster the discussion threads using agglomerative clustering. Other clustering methods may be used.

The preprocessed and labeled discussion threads are discussion threads from the Q&A support application (102), that are augmented and annotated with labels that identify topics and sub-topics, source documents, developer feedback responses, and SME recommendations, etc. In one or more embodiments, preprocessing the discussion threads may entail removal of basic stop words, offensive language, and personally identifiable information (PII). Preprocessing may further entail removal of Unicode or other serialized characters. The preprocessed and labeled "versions" of the discussion threads serve as topic clustering model inputs to the thread-topic clustering model (112). The thread-topic clustering model (112) may be trained to generate clusters of the input data (i.e., the topic clustering model inputs). The clusters are clusters of the discussion threads regarding a given main topic. A large number of discussion threads in a cluster may indicate that the main topic of the particular cluster is a candidate topic for a documentation enhancement or new documentation. Thus, the output generated by the thread-topic clustering model (112) may include a set of candidate topics (131). The candidate topics (131) are clusters of large numbers of discussion threads.

The application computing system (110) further includes a support documentation generation application (113). The support documentation generation application (113) is software or application-specific hardware configured to obtain and generate software code-related documentation for diverse capabilities of an enterprise codebase. The sources for support documentation may include annotated source code, discussion threads of Q&A support applications, support ticket tracking applications, etc. A typical user of the support documentation generation application (113) may be a capability owner individual, or team. Examples of support documentation generation applications include Document360®, Doxygen®, Confluence®, Scribe®, etc.

While FIG. 1 shows a configuration of components, other configurations may be used without departing from the scope of one or more embodiments. For example, various components may be combined to create a single component. As another example, the functionality performed by a single component may be performed by two or more components.

Figure 2:
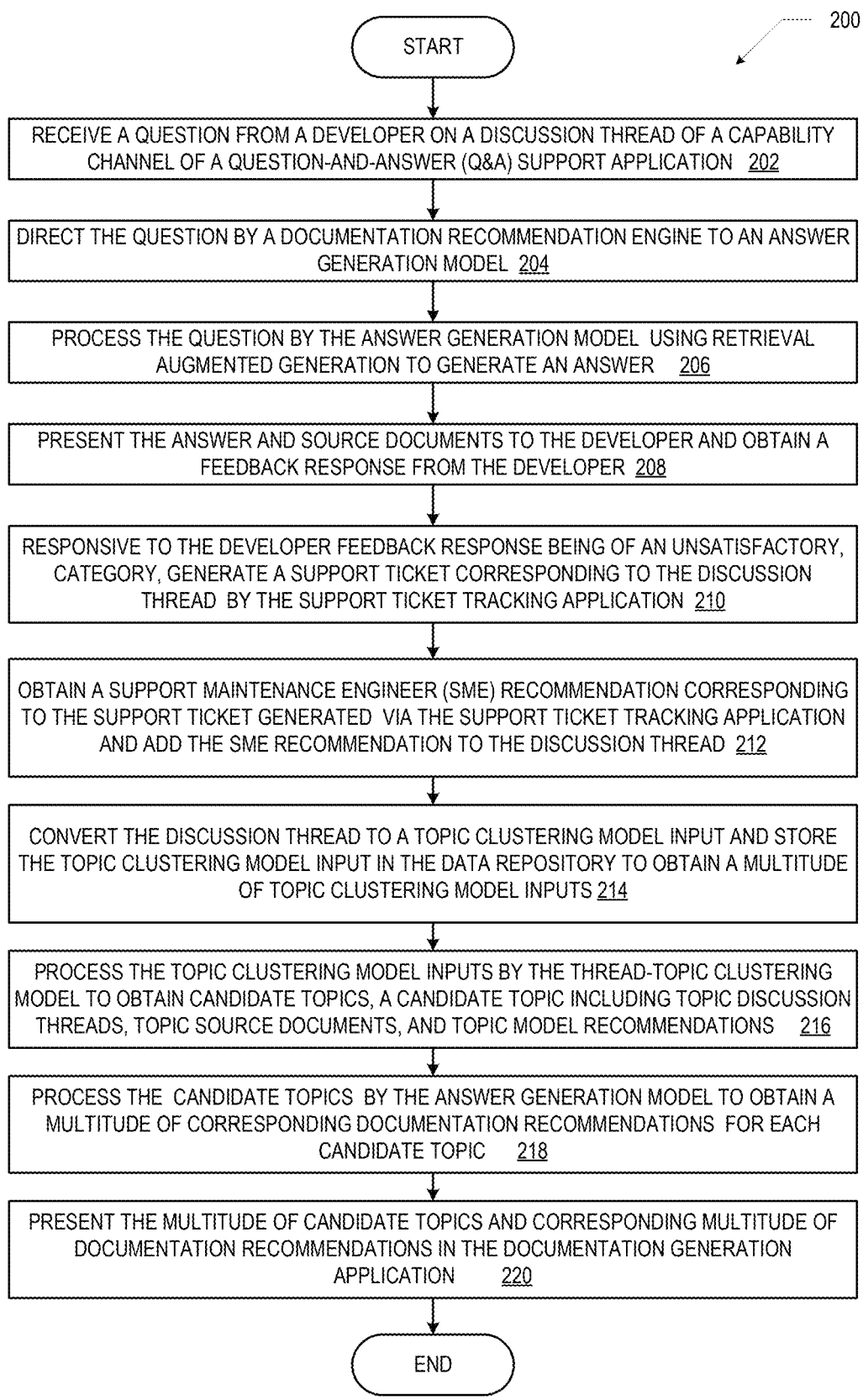
FIG. 2 shows a flowchart of a method, in accordance with one or more embodiments.

FIG. 2 shows a flowchart 200 of a method for generating recommendations for improvements to support documentation, in accordance with one or more embodiments. The method of FIG. 2 may be implemented using the system of FIG. 1 and one or more of the steps may be performed on or received at one or more computer processors. While the various steps in the flowchart 200 are presented and described sequentially, at least some of the steps may be executed in different orders, may be combined, or omitted, and at least some of the steps may be executed in parallel. Furthermore, the steps may be performed actively or passively.

In Block 202, a question is received from a developer on a discussion thread of a capability channel of the Q&A support application. In one or more embodiments, the discussion thread may correspond to a capability channel of the Q&A support application. Further, the discussion thread may include the question, the answer, the corresponding source documents of the answer, and the feedback response. The discussion thread may include multiple questions and corresponding answers. Multiple sets of source documents may correspond respectively to the multiple answers.

In Block 204, the question may be directed by the documentation recommendation engine to the answer generation model. In one or more embodiments, the Q&A moderator may be configured to determine the intent of the question. The intent of a question refers to the underlying purpose or goal that the originator of the question aims to achieve. Intent may be thought of as the semantic meaning or action that the originator of the question meant to convey or elicit. One or more source documents may be retrieved by the Q&A moderator of the documentation recommendation engine. The retrieved source documents may be determined by the Q&A moderator as being relevant to the intent of the question. Further, the AI agent of the documentation recommendation engine may programmatically invoke the answer generation model with the question and source documents as parameters to generate an answer.

In Block 206, the question is processed by the answer generation model. The answer generation model may use retrieval augmented generation (RAG) to generate the answer. In one or more embodiments, the answer generation model may receive one or more source documents with the question, as parameters. In other embodiments, the answer generation model determine the intent of the question. Further, the answer generation model may select one or more source documents from the document store of the data repository. The selected source documents may be determined by the answer generation model to be relevant to the intent of the question.

In Block 208, the answer and source documents are presented to the developer and a feedback response is obtained from the developer. In one or more embodiments, the answer and source documents may be presented to the developer in the Q&A support application. Further, the feedback response may be obtained from the developer regarding the answer and corresponding source documents of the answer, in the discussion thread initiated by the developer, via the Q&A support application. In one or more embodiments, the Q&A support application may be configured to present the developer with predefined feedback categories in a user interface, for example, "Answer helped," "Insufficient answer," "Misunderstood my question," "Need further explanation," etc. The predefined answers may correspond to satisfactory and unsatisfactory categories of feedback responses. Additionally, the Q&A support application may provide a widget in the user interface for the developer to provide additional feedback in natural language sentences. The feedback may pertain to the answer and further, to the source documents returned by the answer generation model.

In Block 210, responsive to the developer feedback response being of an unsatisfactory, category, a support ticket corresponding to the discussion thread may be generated. The support ticket may be generated by the support ticket tracking application. In one or more embodiments, a support ticket generation event may be triggered by the Q&A support application, working in conjunction with the support ticket tracking application. For example, if the developer selects a predefined feedback response "Insufficient answer," then the predefined feedback response belongs to the feedback response category of "unsatisfactory." In this case, the Q&A support application may generate a further communication to the developer, for example, "Do you want to raise a support ticket." Responsive to confirmation from the developer, the Q&A support application may generate the support ticket in the support ticket tracking application. In other embodiments, the Q&A support application may automatically generate a support ticket corresponding to the discussion thread in the support ticket tracking application. The automatic generation may be triggered if a feedback response specifying an unsatisfactory category is selected by the developer.

In Block 212, an SME recommendation may be obtained via the support ticket tracking application corresponding to the support ticket. The SME recommendation may be added to the discussion thread. In one or more embodiments, the discussion thread may be augmented with a support recommendation based on the answer, the feedback response, and the corresponding source documents. For example, the support recommendation may be a specific recommendation to enhance a particular source document with specific information that is relevant to the question posed by the developer. In one or more embodiments, the support recommendation may be generated by a SME servicing the support ticket in the support ticket tracking application. Thus, the support recommendation may correspond to the SME recommendation shown in FIG. 1. In one or more embodiments, the support recommendation may be added as a metadata field to the discussion thread, or as a separate data field in the discussion thread.

In Block 214, the discussion thread is converted to a topic clustering model input. Further the topic clustering model input is stored in the data repository. In this manner, a multitude of topic clustering model inputs is obtained. In one or more embodiments, the discussion thread may be converted into a topic model clustering input. The discussion thread may be converted responsive to the feedback response specifying an unsatisfactory category of feedback responses to obtain a multitude of topic clustering model inputs. In one or more embodiments, a multitude of discussion threads corresponding to a multitude of capability channels of the Q&A support application may be converted to corresponding topic clustering model inputs. In one or more embodiments, the discussion thread preprocessor may obtain the discussion thread from the support ticket, and convert the discussion thread. The discussion thread may be converted to a machine understandable format. More particularly, the discussion thread preprocessor may add metadata and labels to the discussion thread to convert the discussion thread to a topic clustering model input.

Clusters are the outputs of unsupervised machine learning models, which group unlabeled data with similar feature characteristics into the clusters. Clusters help manage large volumes of data by breaking data down into manageable groups. Clustering discussion threads by topic serves to organize the discussion threads into coherent topics. Clusters provide context to individual messages, making it easier to understand the overall discussion. By grouping similar discussions, repetitive questions and answers may be consolidated and minimized. Clustering further facilitates effective resource allocation by identifying which topics require more attention or support. Clusters can highlight frequently discussed issues, helping prioritize documentation requests. Thus, the topic clusters may serve to identify popular topics and trends within the developer community. Further, automatic topic clustering may facilitate searching through vast volumes of data to identify knowledge gaps, highlighting areas where documentation or additional resources are needed.

Accordingly, in Block 216, the topic clustering model inputs are processed by the thread-topic clustering model to obtain a multitude of candidate topics. A candidate topic may include topic discussion threads, topic source documents, and topic model recommendations. In one or more embodiments, the multitude of topic clustering model inputs may be clustered by the thread-topic clustering model based on the main topic of the corresponding conversations of the converted discussion threads. In one or more embodiments, the multitude of topic clustering model inputs may be periodically processed by the thread-topic clustering model to obtain a multitude of candidate topics. For example, the thread-topic model may process the multitude of topic clustering model inputs once every calendar month. A candidate topic may include a multitude of corresponding topic discussion threads, a multitude of corresponding topic source documents, and a multitude of corresponding topic model recommendations. In one or more embodiments, the multitude of corresponding topic source documents of the candidate topic may be an aggregation of source documents. The source documents may be corresponding source documents of answers of respective topic discussion threads of the multitude of corresponding topic discussion threads of the candidate topic. For example, a candidate topic may include topic discussion threads {T1, T2, T3}. The source documents of topic discussion thread T1 may be D1 and D2, of topic discussion thread T2 may be D3, of topic discussion thread T3 may be D4 and D5. Thus, the topic source documents of the candidate topic may be, {D1, D2, D3, D4, D5}. In a similar manner, the multitude of corresponding topic model recommendations of the candidate topic may be an aggregation of support recommendations. The support recommendations may be the support recommendations augmented to the respective topic discussion threads of the multitude of corresponding topic discussion threads of the candidate topic.

In Block 218, the candidate topics are processed by the answer generation model to obtain a multitude of corresponding documentation recommendations for each candidate topic. In one or more embodiments, a candidate topic of the multitude of candidate topics may be processed by the answer generation model to obtain a multitude of corresponding documentation recommendations for the candidate topic. The multitude of candidate topics may be processed in a similar manner.

In Block 220, the multitude of candidate topics and corresponding multitudes of documentation recommendations are presented in the documentation generation application. In one or more embodiments, a candidate topic and a multitude of corresponding documentation recommendations may be presented. In one or more embodiments, the candidate topics and documentation recommendations may be presented in a dashboard of the documentation generation application. In other embodiments, the candidate topics and documentation recommendations may be presented as alerts in the documentation generation application.

Figure 3:
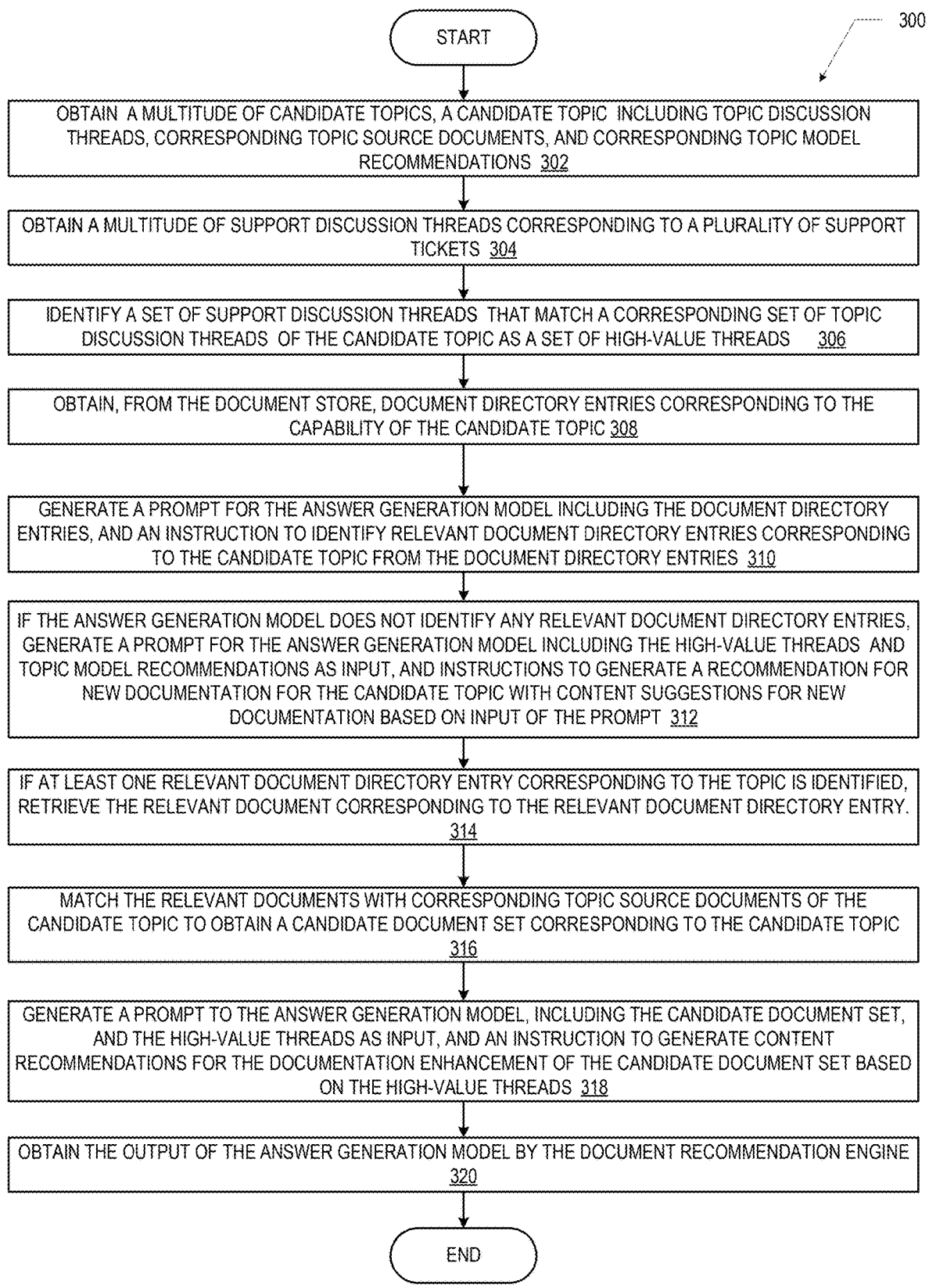
FIG. 3 shows a flowchart of a method, in accordance with one or more embodiments.

FIG. 3 shows a flowchart 300 of a method for generating recommendations for improvements to support documentation, in accordance with one or more embodiments. The method of FIG. 3 may be implemented using the system of FIG. 1 and one or more of the steps may be performed on or received at one or more computer processors. While the various steps in the flowchart 300 are presented and described sequentially, at least some of the steps may be executed in different orders, may be combined, or omitted, and at least some of the steps may be executed in parallel. Furthermore, the steps may be performed actively or passively.

In Block 302, a multitude of candidate topics is obtained. A candidate topic may include topic discussion threads, topic source documents, and topic model recommendations. In one or more embodiments, the multitude of candidate topics may be obtained from the thread-topic clustering model.

In Block 304, a multitude of support discussion threads corresponding to a multitude of support tickets is obtained. In Block 306, a set of support discussion threads that match a corresponding set of topic discussion threads of the candidate topic is identified as a set of high-value threads. In one or more embodiments, the topic-thread postprocessor of the documentation recommendation engine may obtain a multitude of support discussion threads. The multitude of support discussion threads may correspond to a multitude of support tickets from the support ticket tracking application. Further, a set of support discussion threads of the multitude of support discussion threads that match a corresponding set of topic discussion threads of the multitude of corresponding topic discussion threads of the candidate topic may be identified, as a set of high-value threads. In one or more embodiments, the topic-thread postprocessor may use application programming interfaces (APIs) of the support ticket tracking application to obtain the support discussion threads.

In Block 308, a multitude of document directory entries corresponding to the capability of the candidate topic may be obtained from the document store. In one or more embodiments, the capability that includes the candidate topic may be identified by data fields or metadata of the candidate topic. In Block 310, a prompt is generated for the answer generation model. The prompt may include the document directory entries, corresponding to the capability of the candidate topic. The prompt may further include an instruction to identify relevant document directory entries corresponding to the candidate topic from the provided prompt input. The answer generation model may process the prompt to obtain the relevant document directory entries. In one or more embodiments, the answer generation model may process the document directory entries, particularly, document descriptor fields of the document directory entries. The answer generation model may comprehend the information within the document descriptor fields. The answer generation model may further determine that a particular document corresponding to the document description entry is semantically relevant to the candidate topic. The answer generation model may return the relevant document directory entries.

In Block 312, if the answer generation model does not identify any relevant document directory entries, a prompt is generated for the answer generation model. The prompt includes the high-value threads and topic model recommendations as input. The prompt further includes instructions to generate a new documentation recommendation with content suggestions for the new documentation, based on the input of the prompt. In one or more embodiments, responsive to the answer generation model not identifying relevant document directory entries corresponding to the candidate topic, the prompt may be generated for the answer generation model. In one or more embodiments, the answer generation model may process the corresponding conversations of the high-value threads, the topic model recommendations, and additionally, support recommendations of the high-value threads to generate the content suggestions for the new documentation.

In Block 314, if at least one relevant document directory entry corresponding to the topic is identified, the relevant document corresponding to the relevant document directory entry is retrieved. In one or more embodiments, responsive to an answer generation model identifying relevant document directory entries corresponding to the candidate topic, a relevant document set is obtained from the document store. The relevant document set is identified by the relevant document directory entries. In Block 316, the relevant documents are matched with the multitude of corresponding topic source documents of the candidate topic to obtain a candidate document set.

In Block 318, a prompt is generated for the answer generation model. The prompt includes the candidate document set, the high-value threads, and the multitude of corresponding topic model recommendations of the candidate topic as input. The prompt further includes an instruction to generate recommended content for the document enhancement based on the prompt inputs. In one or more embodiments, a prompt to the answer generation model is generated. The prompt includes, as input, the candidate document set, the set of high-value threads, and an instruction to generate a document enhancement recommendation for the candidate document set. The instruction may further include a direction to provide content suggestions for the document enhancement recommendation based on the input of the prompt. In one or more embodiments, the answer generation model may process the prompt and generate a document enhancement recommendation for the candidate document set. The recommendation may include suggested content for the candidate document set. The answer generation model may generate the suggested content based on the conversations of the corresponding high-value threads of the set of high-value threads. In Block 320, the output of the answer generation model is obtained by the documentation recommendation engine. In one or more embodiments the output may be sent to the documentation generation application.

FIG. 4 shows some examples of the outputs of various components of the system of FIG. 1, in accordance with one or more embodiments. Block 402 shows an example of a discussion thread of the Q&A application. The question "How do I disable Intelligent Assist Auto-Response for a particular page," is met with an answer and a corresponding source document, namely, "http://Iassist_capability/overview.html." In Block 404, the developer may select a feedback response from a set of predefined feedback responses as "The document lacks information". This feedback response falls in the "unsatisfactory" feedback response category. As a result, a support ticket is opened. The support ticket tracking application may request the SME to enter a recommendation for the discussion thread. The SME may analyze the source document, question and answer of the discussion thread and note the fact that the retrieved source document does not include the API call of the answer. In other words, documentation for the API call may not exist, and the answer generation model may be using internalized knowledge, or hallucinating, to generate the answer.

Block 406 shows an example output of the topic clustering model. The topic clustering model may include topic clusters under a particular capability of the enterprise codebase. Block 412 shows the topic cluster for the candidate topic "MANAGE INTELLIGENT ASSIST AUTO-RESPONSE". The candidate topic has three topic discussion threads, with related conversations. The number of discussion threads for the particular candidate topic may indicate that developers are frequently looking for information on how to selectively disable Intelligent Assist for a particular page. The associated topic model recommendations, namely, the aggregation of the SME recommendations for the discussion threads may suggest that new documentation is to be generated. In fact, in Block 406, when document directory entries are retrieved for the capability, it is observed that there is no document directory entry for managing the intelligent assist auto-response. The document directory sub-tree under the capability INTELLIGENT ASSIST CAPABILITY shows the lack of a topic for managing Intelligent Assist Auto-Response. Block 408 shows an example of the output of the answer generation model in after a document mapping and retrieval attempt. Block 408 further shows an example of a prompt to the answer generation model to generate a new documentation recommendation. Block 410 shows the response generated by the answer generation model when processing the prompt of Block 408. The response of Block 410 may be shown in the documentation generation application. A corresponding capability owner may use the information of the response and accordingly generate new support documentation for managing intelligent assist auto-responses.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
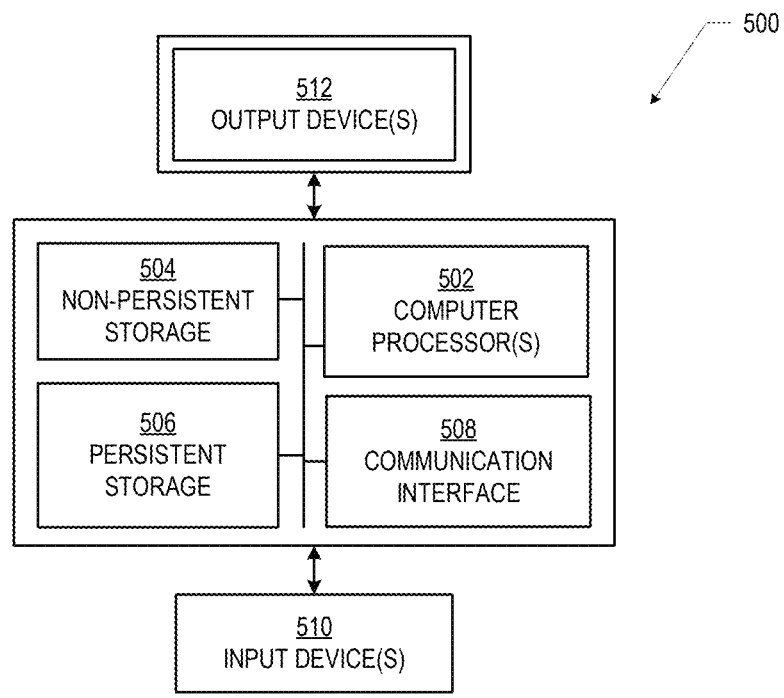
FIG. 5A and FIG. 5B show a computing system, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
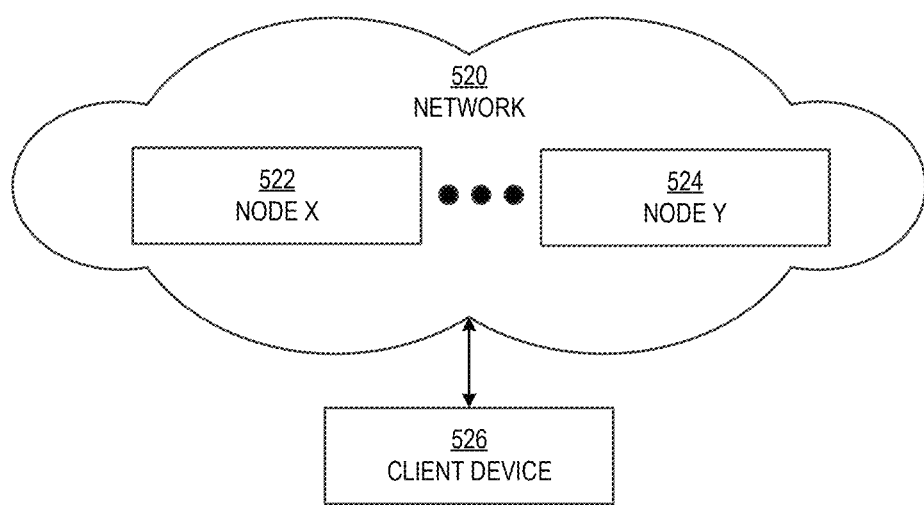

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
obtaining at least one feedback response from a developer regarding an answer and corresponding source documents of the answer in a discussion thread initiated by the developer;
converting the discussion thread into a topic model clustering input, responsive to the feedback response specifying an unsatisfactory category of feedback responses, to obtain a plurality of topic clustering model inputs;
periodically processing the plurality of topic clustering model inputs by a thread-topic clustering model to obtain a plurality of candidate topics;
processing, by an answer generation model, a first candidate topic of the plurality of candidate topics to obtain a plurality of corresponding documentation recommendations for the first candidate topic;
presenting the first candidate topic and the plurality of corresponding documentation recommendations in a documentation generation application;
receiving a question from the developer on a second discussion thread about the first candidate topic, wherein the second discussion thread corresponds to a capability channel of a question-and-answer (Q&A) support application;
processing, to generate a second answer, the question by the answer generation model using retrieval augmented generation (RAG) to obtain a source document retrieved in accordance with the plurality of corresponding documentation recommendations;
presenting the second answer and the source document of the second answer in the Q&A support application;
obtaining a second feedback response from the developer via the Q&A support application; and
responsive to the second feedback response specifying the unsatisfactory category of feedback responses,
generating a support ticket corresponding to the second discussion thread, and
augmenting the second discussion thread with a support recommendation generated responsive to the support ticket and based on the second answer, the second feedback response, and the corresponding source document of the second answer.

2. The method of claim 1, further comprising:
converting a plurality of discussion threads corresponding to a plurality of capability channels of the Q&A support application to corresponding topic clustering model inputs to obtain the plurality of topic clustering model inputs, responsive to the at least one feedback response of the discussion thread of the plurality of discussion threads specifying the unsatisfactory category of feedback responses.

3. The method of claim 1, further comprising:
obtaining the first candidate topic from the thread-topic clustering model, wherein the first candidate topic comprises a plurality of corresponding topic discussion threads, a plurality of corresponding topic source documents, and a plurality of corresponding topic model recommendations;
obtaining a plurality of support discussion threads corresponding to a plurality of support tickets; and
identifying a set of support discussion threads from the plurality of support discussion threads that match a corresponding set of topic discussion threads of the plurality of corresponding topic discussion threads of the first candidate topic as a set of high-value threads.

4. The method of claim 3, further comprising:
processing the first candidate topic by the answer generation model, by:
obtaining a plurality of document directory entries corresponding to a capability of the first candidate topic,
generating a prompt to the answer generation model including, as input, the plurality of document directory entries, and an instruction to identify relevant document directory entries corresponding to the first candidate topic from the plurality of document directory entries, and
processing the prompt by the answer generation model to obtain the relevant document directory entries.

5. The method of claim 3, further comprising:
processing the first candidate topic by the answer generation model, by:
responsive to the answer generation model not identifying relevant document directory entries corresponding to the first candidate topic,
generating a prompt to the answer generation model including, as input, the set of high-value threads, and the plurality of corresponding topic model recommendations corresponding to the first candidate topic, and an instruction to generate a new documentation recommendation with content suggestions for the new documentation recommendation based on the input of the prompt.

6. The method of claim 3, further comprising:
processing the first candidate topic by the answer generation model, by:
responsive to the answer generation model identifying relevant document directory entries corresponding to the first candidate topic,
obtaining a relevant document set identified by the relevant document directory entries from a document store,
matching the relevant document set with the plurality of corresponding topic source documents of the first candidate topic to obtain a candidate document set, and
generating a prompt to the answer generation model including, as input, the candidate document set, the set of high-value threads, and the plurality of corresponding topic model recommendations of the first candidate topic, and an instruction to generate a document enhancement recommendation for the candidate document set, with content suggestions for the document enhancement recommendation based on the input of the prompt.

7. The method of claim 3, wherein:
the plurality of corresponding topic source documents of the first candidate topic is an aggregation of corresponding source documents of answers of respective topic discussion threads of the plurality of corresponding topic discussion threads of the first candidate topic; and
the plurality of corresponding topic model recommendations of the first candidate topic is an aggregation of support recommendations of respective topic discussion threads of the plurality of corresponding topic discussion threads of the first candidate topic.

8. A system, comprising:
at least one computer processor,
an answer generation model, executing on the at least one computer processor, and
a thread-topic clustering model, executing on the at least one computer processor, wherein the system is configured to:
obtain at least one feedback response from a developer regarding an answer and corresponding source documents of the answer in a discussion thread initiated by the developer,
convert the discussion thread into a topic model clustering input, responsive to the feedback response specifying an unsatisfactory category of feedback responses, to obtain a plurality of topic clustering model inputs,
periodically process the plurality of topic clustering model inputs by the thread-topic clustering model to obtain a plurality of candidate topics,
process, by the answer generation model, a first candidate topic of the plurality of candidate topics to obtain a plurality of corresponding documentation recommendations for the first candidate topic,
present the first candidate topic and the plurality of corresponding documentation recommendations in a documentation generation application,
receive a question from the developer on a second discussion thread about the first candidate topic, wherein the second discussion thread corresponds to a capability channel of a question-and-answer (Q&A) support application,
process, to generate a second answer, the question by the answer generation model, using retrieval augmented generation (RAG) to obtain a source document retrieved in accordance with the plurality of the corresponding documentation recommendations,
present the second answer and the source document of the second answer in the Q&A support application,
obtain a second feedback response from the developer via the Q&A support application, and
responsive to the second feedback response specifying the unsatisfactory category of feedback responses,
generate a support ticket corresponding to the second discussion thread, and
augment the second discussion thread with a support recommendation generated responsive to the support ticket, and based on the second answer, the second feedback response, and the corresponding source document of the second answer.

9. The system of claim 8, further configured to:
convert a plurality of discussion threads corresponding to a plurality of capability channels of the Q&A support application to corresponding topic clustering model inputs to obtain the plurality of topic clustering model inputs, responsive to the at least one feedback response of the discussion thread of the plurality of discussion threads specifying the unsatisfactory category of feedback responses.

10. The system of claim 8, further configured to:
obtain the first candidate topic from the thread-topic clustering model, wherein the first candidate topic comprises a plurality of corresponding topic discussion threads, a plurality of corresponding topic source documents, and a plurality of corresponding topic model recommendations;
obtain a plurality of support discussion threads corresponding to a plurality of support tickets; and
identify a set of support discussion threads from the plurality of support discussion threads that match a corresponding set of topic discussion threads of the plurality of corresponding topic discussion threads of the first candidate topic as a set of high-value threads.

11. The system of claim 10, further configured to:
process the first candidate topic by the answer generation model, by:
obtaining a plurality of document directory entries corresponding to a capability of the first candidate topic,
generating a prompt to the answer generation model including, as input, the plurality of document directory entries, and an instruction to identify relevant document directory entries corresponding to the first candidate topic from the plurality of document directory entries, and
processing the prompt by the answer generation model to obtain the relevant document directory entries.

12. The system of claim 10, further configured to:
process the first candidate topic by the answer generation model, by:
responsive to the answer generation model not identifying relevant document directory entries corresponding to the first candidate topic,
generating a prompt to the answer generation model including, as input, the set of high-value threads, and the plurality of corresponding topic model recommendations corresponding to the first candidate topic, and an instruction to generate a new documentation recommendation with content suggestions for the new documentation recommendation based on the input of the prompt.

13. The system of claim 10, further configured to:
process the first candidate topic by the answer generation model, by:
responsive to the answer generation model identifying relevant document directory entries corresponding to the first candidate topic,
obtaining a relevant document set identified by the relevant document directory entries from a document store,
matching the relevant document set with the plurality of corresponding topic source documents of the first candidate topic to obtain a candidate document set, and
generating a prompt to the answer generation model including, as input, the candidate document set, the set of high-value threads, and the plurality of corresponding topic model recommendations of the first candidate topic, and an instruction to generate a document enhancement recommendation for the candidate document set, with content suggestions for the document enhancement recommendation based on the input of the prompt.

14. The system of claim 10, wherein:
the plurality of corresponding topic source documents of the first candidate topic is an aggregation of corresponding source documents of answers of respective topic discussion threads of the plurality of corresponding topic discussion threads of the first candidate topic; and
the plurality of corresponding topic model recommendations of the first candidate topic is an aggregation of support recommendations of respective topic discussion threads of the plurality of corresponding topic discussion threads of the first candidate topic.

15. A method, comprising:
obtaining a first candidate topic of a plurality of candidate topics from a thread-topic clustering model, wherein the first candidate topic comprises a plurality of corresponding topic discussion threads, a plurality of corresponding topic source documents, and a plurality of corresponding topic model recommendations;
obtaining a plurality of support discussion threads corresponding to a plurality of support tickets;
identifying a set of support discussion threads from the plurality of support discussion threads that match a corresponding set of topic discussion threads of the plurality of corresponding topic discussion threads of the first candidate topic as a set of high-value threads;
obtaining a plurality of document directory entries corresponding to a capability of the first candidate topic;
transmitting a first prompt to an answer generation model including, as a first input, the plurality of document directory entries, and a first instruction to identify relevant document directory entries corresponding to the first candidate topic from the plurality of document directory entries;
processing the first prompt by the answer generation model to obtain the relevant document directory entries;
obtaining a relevant document set identified by the relevant document directory entries from a document store;
matching the relevant document set with the plurality of corresponding topic source documents of the first candidate topic to obtain a candidate document set;
transmitting a second prompt to the answer generation model including, as a second input, the candidate document set, the set of high-value threads, and the plurality of corresponding topic model recommendations of the first candidate topic, and a second instruction to generate a document enhancement recommendation for the candidate document set, with content suggestions for the document enhancement recommendation based on the second input of the second prompt; and responsive to the answer generation model not identifying relevant document directory entries corresponding to the first candidate topic,
- transmitting a third prompt to the answer generation model including, as a third input, the set of high-value threads, and the plurality of corresponding topic model recommendations corresponding to the first candidate topic, and a third instruction to generate a new documentation recommendation with content suggestions for the new documentation recommendation based on the third input of the third prompt;
- transmitting the new documentation recommendation to a documentation generation application;
- obtaining, from the documentation generation application a new document corresponding to the new documentation recommendation; and
- storing the new document.

* * * * *